US012351433B2

(12) United States Patent
Haapaniemi et al.

(10) Patent No.: US 12,351,433 B2
(45) Date of Patent: Jul. 8, 2025

(54) METHOD FOR CONSTRUCTING AN ELEVATOR, GUIDE RAIL INSTALLATION APPARATUS, GUIDE RAIL INSTALLATION ARRANGEMENT AND METHOD FOR INSTALLING A GUIDE RAIL OF AN ELEVATOR

(71) Applicant: Kone Corporation, Helsinki (FI)

(72) Inventors: Markku Haapaniemi, Helsinki (FI); Matti Rasanen, Helsinki (FI); Jari Ryhanen, Helsinki (FI); Jaakko Kahila, Helsinki (FI); Aki Haikonen, Helsinki (FI); Jorma Mustalahti, Helsinki (FI); Anssi Venho, Helsinki (FI); Otto Lanz, Helsinki (FI); Janne Laine, Helsinki (FI)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 18/299,383

(22) Filed: Apr. 12, 2023

(65) Prior Publication Data

US 2023/0242379 A1 Aug. 3, 2023

Related U.S. Application Data

(63) Continuation of application No. PCT/EP2020/078785, filed on Oct. 13, 2020.

(51) Int. Cl.
*B66B 19/04* (2006.01)
*B66B 19/00* (2006.01)
*B66B 19/02* (2006.01)

(52) U.S. Cl.
CPC ............ *B66B 19/04* (2013.01); *B66B 19/002* (2013.01); *B66B 19/005* (2013.01); *B66B 19/02* (2013.01)

(58) Field of Classification Search
CPC ....... B66B 19/04; B66B 19/02; B66B 19/002; B66B 19/005
See application file for complete search history.

(56) References Cited

U.S. PATENT DOCUMENTS 8,485,319 B2 * 7/2013 Peacock .................. B66B 7/027 187/414
9,309,092 B2 * 4/2016 Tenhunen ........... B66B 11/0045
(Continued)

FOREIGN PATENT DOCUMENTS

DE 10 2012 111778 A1 6/2014
EP 1591406 A2 * 11/2005 ............. B66B 19/02
(Continued)

OTHER PUBLICATIONS

Machine translation of the description of JP 2017159982 A. (Year: 2017).*
(Continued)

*Primary Examiner* — Minh Truong
*Assistant Examiner* — Michelle M Mudwilder
(74) *Attorney, Agent, or Firm* — Harness, Dickey & Pierce, P.L.C.

(57) ABSTRACT

The invention relates to a method for constructing an elevator including installing an elevator car, a counterweight, guide rail lines, a hoisting machine in a first position, and a first hoisting roping, connecting the first hoisting roping to the elevator car and counterweight; and transporting the elevator car vertically in the hoistway; removing the hoisting machine from the first position and disconnecting the first hoisting roping from the elevator car and counterweight; installing the hoisting machine, in a higher second position, and a second roping, connecting the second hoisting roping to the elevator car and counterweight; and transporting the elevator car vertically in the hoistway while
(Continued)

the hoisting machine is in the second position using the hoisting machine and the second hoisting roping.

16 Claims, 8 Drawing Sheets

(56) References Cited

U.S. PATENT DOCUMENTS

| | | | | |
|---|---|---|---|---|
| 9,676,595 | B2 * | 6/2017 | Plathin | B66B 11/00 |
| 10,745,246 | B2 * | 8/2020 | Fonteneau | B66B 7/022 |
| 2014/0000987 | A1 | 1/2014 | Peacock et al. | |
| 2014/0231179 | A1 * | 8/2014 | Alasentie | B66B 19/00 187/251 |
| 2015/0336771 | A1 * | 11/2015 | Yoshikawa | B66B 19/002 52/741.1 |
| 2019/0276277 | A1 * | 9/2019 | Christen | B66B 19/00 |
| 2020/0283271 | A1 * | 9/2020 | Morse | B66B 19/005 |

FOREIGN PATENT DOCUMENTS

| | | | | | |
|---|---|---|---|---|---|
| JP | S56-141282 | A | | 11/1981 | |
| JP | H07 172716 | A | | 7/1995 | |
| JP | H08-26623 | A | | 1/1996 | |
| JP | 2000-169059 | A | | 6/2000 | |
| JP | 2001-322778 | A | | 11/2001 | |
| JP | 2003-155179 | A | | 5/2003 | |
| JP | 2006-001739 | A | | 1/2006 | |
| JP | 2008-179469 | A | | 8/2008 | |
| JP | 2017159982 | A | * | 9/2017 | B66B 19/02 |
| KR | 101980054 | B1 | * | 5/2019 | |
| WO | WO-2008/059100 | A2 | | 5/2008 | |

OTHER PUBLICATIONS

International Search Report and Written Opinion of the International Searching Authority for International Application No. PCT/EP2020/078785 dated Sep. 15, 2021.

Search Report issued Sep. 14, 2024 in Chinese Application No. 2020801060925.

* cited by examiner

METHOD FOR CONSTRUCTING AN ELEVATOR, GUIDE RAIL INSTALLATION APPARATUS, GUIDE RAIL INSTALLATION ARRANGEMENT AND METHOD FOR INSTALLING A GUIDE RAIL OF AN ELEVATOR

CROSS-REFERENCE TO RELATED APPLICATION

This application is a continuation of PCT International Application No. PCT/EP2020/078785 which has an International filing date of Oct. 13, 2020, the entire contents of which are incorporated herein by reference.

FIELD OF THE INVENTION

An invention according to a first aspect presented in this application relates to a method for constructing an elevator. An invention according to a second aspect presented in this application relates to a guide rail installation apparatus, guide rail installation arrangement and a method for installing a guide rail of an elevator. In general, the elevator is preferably an elevator for transporting passengers and/or goods.

BACKGROUND OF THE INVENTION

During construction work of a building, people and goods need to move for enabling construction work already before the upper floors of the building have been built. To facilitate transportation of people and goods, construction time elevators, so called jump elevators, have been developed. In jump-lifts, the bottom part of an elevator hoistway is taken into use before the building has been completed. In this case the upper parts of the building as well as the top part of the elevator hoistway can be constructed at the same time as an elevator moving in the bottom part of the elevator hoistway already serves people on the lower floors of the building under construction. Typically in jump-lifts the elevator car moving in the lower parts of the elevator hoistway is supported and moved during construction-time use with a hoisting machine supported on a machine room which is vertically movable in the elevator hoistway. The car hangs during its transport use from the movable machine room suspended by an extendable hoisting roping. When the elevator hoistway under construction above the vertically movable machine room has reached a sufficient stage of completion, the completed part of the elevator hoistway can be taken into use. At this stage a "jump" is performed, wherein the vertically movable machine room is hoisted higher in the elevator hoistway and the additional rope needed is taken from rope supply reels to which the hoisting roping passes via openable clamps. Thereafter, the car can reach a higher position than before the jump and start to serve additional floors.

In prior art, a drawback of construction time elevator solutions has been that the process has not been well suitable to all projects due to being relatively laborious and complex. They have been relatively laborious to build and not extremely quick to take into use, nor have they been sufficiently simple and cheap to implement in some projects. Thus, known solutions have not been optimal for cases where there is a need to provide at low cost ability to use elevator early in construction process of the building.

In an elevator construction site, guide rails, such as guide rails of an elevator car and counterweight, are installed in a hoistway. One known solution is to move a guide rail installation apparatus, such as a working platform, carrying a guide rail section to be installed to a suitable position in the hoistway and then placing the guide rail section on top and aligned with an earlier installed part of a vertically oriented guide rail line. Thereafter, the guide rail section is fixed to this position. In prior art, a drawback has been that it is difficult to bring the guide rail section to be installed accurately in alignment with the earlier installed guide rail line. The process has been moreover difficult to implement simply safely such that risks of a guide rail section falling are minimized.

BRIEF DESCRIPTION OF THE INVENTION

The object of the invention according to a first aspect is to introduce an improved method for constructing an elevator. An object is particularly to introduce a solution by which one or more of the above defined problems of prior art and/or drawbacks discussed or implied elsewhere in the description can be solved.

An object with said first aspect is particularly to be able to provide a simple, very swiftly installable, lightweight, and cost effective method enabling transportation to serve users with an elevator car moving in lower parts of an elevator hoistway very early after starting of construction work of the building, and which stepwise adapts to progress of construction work in the upper parts of the building. An object with said first aspect is also to facilitate that the construction time elevator can be one or more of the following: lightweight, quick to build, can be implemented without several robust support points in hoistway walls or structures for anchoring supporting parts, provides a simple way to perform a jump, space efficient.

It is brought forward a new method for constructing an elevator, the method comprising installing elevator components in a hoistway, which hoistway is preferably still under construction and located inside a building under construction, said installing comprising installing an elevator car, a counterweight, one or more vertically oriented guide rail lines, a hoisting machine in a first position (I), and a first hoisting roping for being moved by the hoisting machine, said installing elevator components further comprising connecting the first hoisting roping to the elevator car and counterweight; and thereafter transporting (also referred to as "first" transporting) passengers and/or goods with the elevator car vertically in the hoistway while the hoisting machine is in said first position I; and thereafter stopping said transporting; and thereafter removing said hoisting machine from said first position I and the first roping from the hoistway, said removing comprising disconnecting the first hoisting roping from the elevator car and counterweight;

wherein the method further comprises installing (also referred to as "second installing") a hoisting machine in a second position II which is higher than the first position I, and a second roping for being moved by the hoisting machine, said installing comprising, in particular after the aforementioned disconnecting the first hoisting roping from the elevator car and counterweight, connecting the second hoisting roping to the elevator car and counterweight; and after the second installing transporting (also referred to as "second" transporting) passengers and/or goods with the elevator car vertically in the hoistway while the hoisting machine is in said second position II, said transporting comprising moving the elevator car with the hoisting machine and the second hoisting roping.

With this kind of solution one or more of the above mentioned objects can be achieved.

Preferable further details of the method will be introduced in the following, which further details can be combined with the method individually or in any combination.

In a preferred embodiment, said first transporting comprises automatically moving the elevator car vertically in the hoistway with the hoisting machine and the first hoisting roping between floors in response to signals received by an elevator control system from one or more user interfaces, which are preferably located at one or more floors or inside the elevator car. Preferably, said automatically moving is controlled by an elevator control system operating the hoisting machine. Preferably, said first transporting comprises automatically opening and closing doors of the elevator, in particular the elevator car door and landing doors within traveling zone of the elevator car.

In a preferred embodiment, said second transporting comprises automatically moving the elevator car vertically in the hoistway with the hoisting machine and the second hoisting roping between floors in response to signals received by an elevator control system from one or more user interfaces, which are preferably located at one or more floors or inside the elevator car. Preferably, said automatically moving is controlled by an elevator control system operating the hoisting machine Preferably, said second transporting comprises automatically opening and closing doors of the elevator, in particular the elevator car door and landing doors within traveling zone of the elevator car.

In a preferred embodiment, the first roping is moved out from the hoistway before said second transporting.

In a preferred embodiment, said first roping is used in transporting only while the hoisting machine is in said first position I.

In a preferred embodiment, said removing comprises cutting the first roping and/or winding it to one or more rope reels.

In a preferred embodiment, said installing the first hoisting roping comprises fixing the ends of the first roping to terminal devices such that neither of the opposite ends of individual ropes of the first hoisting roping continues to a rope supply storage such as a rope reel.

In a preferred embodiment, said installing a hoisting machine in first position I comprises mounting the hoisting machine on one or more guide rail lines to be supported vertically by said one or more guide rail lines.

In a preferred embodiment, said installing a hoisting machine in a second position II comprises mounting the hoisting machine on one or more guide rail lines to be supported vertically by said one or more guide rail lines.

In a preferred embodiment the second position II is inside a machine room constructed above the hoistway. One or more guide rail lines can be arranged in the method to continue through the floor of the machine room, which guide rail lines are the same by which the hoisting machine was supported vertically in said first position I.

In a preferred embodiment, the method comprises installing landing doors before said first transporting.

In a preferred embodiment, the installing comprises mounting a first support structure in the hoistway and suspending the elevator car movably with an auxiliary hoisting arrangement from the first support structure.

In a preferred embodiment, the installing elevator components in a hoistway comprises, in particular after installing one or more guide rail lines, hoisting the elevator car with an auxiliary hoisting arrangement along and guided by one or more guide rail lines into proximity of said first position I, and thereafter performing installing work of said hoisting machine and/or said first roping.

In a preferred embodiment, the installing comprises using the roof top of the elevator car as an installation platform for installing other elevator components (meaning other than said car) into the hoistway, said other components preferably including the hoisting machine and/or the first roping, possibly landing doors and/or their structures (e.g. sills, frames horizontal guide rails when the landing doors are sliding doors).

In a preferred embodiment, said using the roof top of the elevator car as an installation platform comprises performing installation work by a person working on the roof top of the elevator car.

In a preferred embodiment, the method comprises after said installing displacing the auxiliary hoisting arrangement, and suspending a working platform with said auxiliary hoisting arrangement from a second support structure, which is higher than said first support structure.

In a preferred embodiment, the installing a hoisting machine in a second position II comprises hoisting the elevator car with an auxiliary hoisting arrangement along and guided by one or more guide rail lines into proximity of said second position II, and thereafter performing installing work of said hoisting machine and/or said second roping.

In a preferred embodiment, the method comprises during said transporting one or more of:

- installing guide rail sections on top of said one or more guide rail lines in portion of the hoistway which is higher than said hoisting machine;
- installing landing doors higher than said hoisting machine, in particular between floors and the hoistway, which floors are higher than said hoisting machine;
- constructing new floors into the building higher than said hoisting machine.

In a preferred embodiment, the method comprises during said transporting constructing a machine room above the hoistway.

In a preferred embodiment, said installing guide rail sections on top of said one or more guide rail lines in portion of the hoistway which is higher than said hoisting machine and/or said installing landing doors between floors and the hoistway, which floors are higher than said hoisting machine, comprises moving a working platform in portion of the hoistway which is higher than said hoisting machine, and preferably performing installation work by a person working on the working platform. The working platform used in said installing is preferably, although not necessarily, a guide rail installation apparatus as described anywhere in this application. In this case, the method for constructing an elevator preferably comprises providing a guide rail installation arrangement as described anywhere in this application.

In a preferred embodiment, the stopping preferably comprises stopping moving the elevator car vertically in the hoistway between floors in response to signals received by an elevator control system from one or more user interfaces located at one or more floors or inside the elevator car.

In a preferred embodiment, the hoisting machine installed in the first position I is a first hoisting machine, and the hoisting machine installed in the second position II is a second hoisting machine.

In a preferred embodiment, said hoisting machine that is installed in said second position II in said second installing is said same hoisting machine installed in said first position I in said first installing.

In a preferred embodiment, in the moving of each said transporting the elevator car is moved along and guided by one or more guide rail lines.

In a preferred embodiment, each said connecting comprises arranging the roping in question to pass around a drive wheel of the hoisting machine in question and suspend the car and counterweight on opposite sides of the drive wheel, preferably such that the roping in question passes on a first side of the drive wheel down to the car, around one or more rope wheels thereof and up to a rope terminal device, and on a second side of the drive wheel down to the counterweight, around one or more rope wheels thereof and up to a rope terminal device.

In a preferred embodiment, the first and second roping both suspend the car and counterweight with suspension ratio 2:1.

In a preferred embodiment, said installing a hoisting machine in a second position II comprises mounting the hoisting machine inside a machine room located above the hoistway.

In a preferred embodiment, said installing a hoisting machine in a second position II comprises mounting the hoisting machine on one or more guide rail lines to be supported vertically by said one or more guide rail lines.

In a preferred embodiment, the hoisting machine is prefixed on a guide rail section so that these can be installed as a unit. For this purpose, the method preferably comprises before said installing elevator components in a hoistway a phase of providing a hoisting machine unit, the hoisting machine unit comprising a hoisting machine, and a guide rail section, on which guide rail section the hoisting machine is fixed. This providing then preferably comprises bringing a hoisting machine unit as mentioned into the hoistway before said installing. Then, in said installing, the hoisting machine unit is moved and positioned such that the guide rail section of the hoisting machine unit is on top and aligned with earlier installed part of a vertically oriented guide rail line.

In a preferred embodiment, in particular for facilitating said removing, the method comprises suspending the car with an auxiliary hoisting arrangement.

In a preferred embodiment, after said installing a hoisting machine in a second position II, the hoisting machine installed in said second position II and said second roping are left permanently at their places to form part of the final elevator, i.e. the elevator to be for constructed with the method.

The object of the invention according to a second aspect is to introduce an improved solution for installing a guide rail line guide rail. An object is here particularly to introduce a solution by which one or more of the above defined problems of prior art and/or drawbacks related to guide rail installation as discussed or implied elsewhere in the description can be solved. An object is particularly to be able to provide a solution by which a guide rail section can be installed simply and safely to be accurately positioned on top of a guide rail line. Particularly, the guide rail section can be brought in a well controlled manner exactly in a desired attitude to the exact position where it is to be fixed. This makes the installation work efficient and safe, in particular by eliminating undesired movement of the guide rail section, as well as reducing risks of the guide rail section falling, as well as by reducing time consuming adjustment work of the guide rail position.

It is brought forward a new guide rail installation apparatus for being vertically moved guided by a vertical (i.e. vertically oriented) guide rail line and to be used in installing one or more additional guide rail sections on top of said guide rail line to extend vertical height thereof, the guide rail installation apparatus comprising a frame and a guide arrangement mounted on the frame, which guide arrangement comprises a first guide for engaging a vertical guide rail line for taking lateral support from said guide rail line; a second guide for engaging a vertical guide rail line for taking lateral support from said guide rail line; wherein the second guide is above the first guide at a vertical distance thereof. The guide arrangement further comprises a guide channel structure above said second guide for laterally supporting and guiding a guide rail section to be installed in vertically oriented position towards the upper end face of the guide rail line engaged by said second guide.

With this kind of solution one or more of the above mentioned objects can be achieved.

Preferable further details of the method have been introduced earlier above and will be introduced in the following, which further details can be combined with the guide rail installation apparatus individually or in any combination.

In a preferred embodiment, said guide channel structure comprises a guide opening (also referred to as the "third guide opening") for receiving a guide flange of said guide rail section to be installed. The third guide opening is vertically elongated, i.e. elongated in vertical direction.

In a preferred embodiment, said first guide comprises a first guide opening for receiving a guide flange of said guide rail line; and said second guide comprises a second guide opening for receiving a guide flange of said guide rail line; and said guide channel structure comprises a vertically elongated third guide opening for receiving a guide flange of said guide rail section to be installed;

wherein the vertical projections of said first, second and third guide opening overlap.

In a preferred embodiment, each said first, second and third guide opening is bordered on three lateral sides by a guide part, preferably by a guide face of a guide part.

In a preferred embodiment, the guide arrangement further comprises a third guide, which third guide is above the second guide at a vertical distance thereof, and the vertically elongated guide opening of guide channel extends between the second guide and the third guide. The third guide is preferably suitable for engaging a vertical guide rail line for taking lateral support from said guide rail line and/or for laterally supporting and guiding a guide rail section to be installed.

In a preferred embodiment, said third guide comprises a fourth guide opening for receiving a guide flange of the guide rail section to be installed and/or said guide rail line, wherein the vertical projections of said first, second, third and fourth guide opening overlap.

In a preferred embodiment, said fourth guide opening is bordered on three lateral sides by a guide part.

In a preferred embodiment, said guide parts comprise guide parts which are rollers and/or guide parts which are slide members.

In a preferred embodiment, the guide rail installation apparatus comprises a working platform floor on top of which a person can stand and/or a safety railing bordering a working space on top of said working platform floor.

In a preferred embodiment, the guide rail installation apparatus comprises two guide arrangements mounted on the frame as defined.

It is also brought forward a new guide rail installation arrangement comprising a guide rail line;

a guide rail installation apparatus as defined anywhere above:

a guide rail section to be installed on top of said guide rail line;

wherein said guide rail installation apparatus is mounted on said guide rail line such that the first guide engages said vertical guide rail line taking lateral support from said guide rail line on a first vertical height and said second guide engages said vertical guide rail line taking lateral support from said guide rail line on a second, higher than said first, vertical height, the upper end face of the guide rail line being higher than said second guide; and wherein said guide rail section to be installed on top of said guide rail line is positioned vertically oriented and laterally supported by the guide channel structure, the lower end face thereof being at a distance from the upper end face of the guide rail line; the guide rail section being thereby arranged to be lowerable towards the upper end face of the guide rail line in vertically oriented position laterally guided by the guide channel structure.

With this kind of solution one or more of the above mentioned objects can be achieved.

Preferable further details of the guide rail installation arrangement have been introduced earlier above and will be introduced in the following, which further details can be combined with the guide rail installation arrangement individually or in any combination.

In a preferred embodiment of the guide rail installation arrangement, a guide flange of the lower end of said guide rail section to be installed extends into a vertically elongated guide opening of the guide channel structure for being lowered therein towards the upper end face of the guide rail line.

In a preferred embodiment of the guide rail installation arrangement, a guide flange of the upper end of said guide rail line extends into a vertically elongated guide opening of the guide channel structure.

In a preferred embodiment of the guide rail installation apparatus or a guide rail installation arrangement, the third guide opening is at least 50 cm long in vertical direction.

In a preferred embodiment of the guide rail installation apparatus or a guide rail installation arrangement, the third guide opening is elongated and U-shaped.

In a preferred embodiment of the guide rail installation apparatus or a guide rail installation arrangement, the third guide opening is bordered on three lateral sides by a guide part, in particular a guide face of a guide part, each guide part preferably being at least 50 cm long in vertical direction.

In a preferred embodiment of the guide rail installation apparatus or a guide rail installation arrangement, the guide faces bordering the third guide opening on three lateral sides are at least 50 cm long in vertical direction.

In a preferred embodiment of the guide rail installation apparatus or a guide rail installation arrangement, the guide faces are each straight and vertically oriented.

In a preferred embodiment of the guide rail installation arrangement, the upper portions of the guide faces bordering the third guide opening on three lateral sides support laterally a guide flange of the lower end of said guide rail section to be installed and the lower portions of the guide faces bordering the third guide opening on three lateral sides are supported laterally against a guide flange of the upper end of said guide rail line.

In a preferred embodiment of the guide rail installation apparatus or a guide rail installation arrangement, said guide faces are sliding guide faces for engaging with a sliding contact a guide flange of the guide rail section and/or a guide flange of the guide rail line.

In a preferred embodiment of the guide rail installation apparatus or a guide rail installation arrangement, said third guide is a sliding guide for engaging with a sliding contact the guide rail section to be installed, in particular such that the guide rail section to be installed can be slid against and in contact with the guide faces of the third guide.

In a preferred embodiment of the guide rail installation apparatus or a guide rail installation arrangement, said third guide is unrotatable relative to the frame.

In a preferred embodiment of the guide rail installation apparatus or a guide rail installation arrangement, one or more of said first second and third guide is a roller guide.

In a preferred embodiment of the guide rail installation apparatus or the guide rail installation arrangement, the guide rail installation apparatus is vertically movable by an auxiliary hoisting arrangement. Then, the guide rail installation arrangement preferably comprises an auxiliary hoisting arrangement for hoisting the guide rail installation apparatus.

It is also brought forward a new method for installing a guide rail comprising providing a guide rail line;

providing a guide rail installation apparatus as defined anywhere above:

providing a guide rail section to be installed on top of said guide rail line;

mounting said guide rail installation apparatus on said guide rail line such that the first guide engages said vertical guide rail line taking lateral support (i.e. support in horizontal direction) from said guide rail line on a first vertical height and said second guide engages said vertical guide rail line taking lateral support from said guide rail line on a second, higher than said first, vertical height the upper end face of the guide rail line being higher than said second guide; and positioning said guide rail section to be vertically oriented and laterally (i.e. in horizontal direction) supported by the guide channel structure, the lower end face thereof being at a distance from the upper end face of the guide rail line; the guide rail section being thereby arranged to be lowerable towards the upper end face of the guide rail line in vertically oriented position laterally guided by the guide channel structure; and lowering the guide rail section towards the upper end face of the guide rail line in vertically oriented position laterally guided by the guide channel structure.

With this kind of solution one or more of the above mentioned objects can be achieved.

Preferable further details of the method for installing a guide rail have been introduced earlier above and will be introduced in the following, which further details can be combined with the method for installing a guide rail individually or in any combination.

In a preferred embodiment, said positioning comprises moving a guide flange of the lower end of said guide rail section to extend into a vertically elongated guide opening of the guide channel structure.

In a preferred embodiment, in said lowering a guide flange of the lower end of said guide rail section moves within a vertically elongated guide opening of the guide channel structure towards the upper end face of the guide rail line.

In a preferred embodiment, said positioning comprises moving a guide flange of the lower end of said guide rail section to extend into a guide opening of the third guide, after which said moving a guide flange of the lower end of said guide rail section to extend into a vertically elongated guide opening of the guide channel structure is performed such that the guide opening of the third guide guides movement of said guide rail section.

In a preferred embodiment, said lowering the guide rail section towards the upper end face of the guide rail line in vertically oriented position laterally guided by the guide channel structure comprises lowering the guide rail section such that the lower end face thereof moves into contact with the upper end face of the guide rail line.

In a preferred embodiment, in said lowering the lower end moves to be beside a fixing plate earlier fixed to the upper end of the guide rail line and protruding above the upper end face of the guide rail line.

In a preferred embodiment, after said lowering the guide rail section, the guide rail section is fixed to the guide rail line in particular with the aforementioned fixing plate.

In a preferred embodiment, in the method for installing a guide rail, in particular in said positioning, a guide rail installation arrangement is formed, which is as defined anywhere above.

In general, in any of the preferred embodiments, the car preferably comprises an interior space suitable for receiving a passenger or passengers, and a door movable between open and closed state for opening and closing the interior space.

BRIEF DESCRIPTION OF THE DRAWINGS

In the following, the present invention will be described in more detail by way of example and with reference to the attached drawings, in which.

The foregoing aspects, features and advantages of the invention will be apparent from the drawings and the detailed description related thereto.

DETAILED DESCRIPTION

Figure 1:
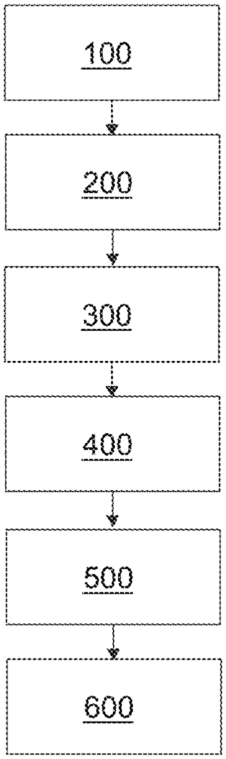
FIG. 1 illustrates steps of a method for constructing an elevator.

FIG. 1 illustrates steps of a method for constructing an elevator. The method comprises installing 100 (also referred to as “first” installing) elevator components in a hoistway, which hoistway is in particular still under construction and located inside a building under construction, said components including an elevator car, counterweight, one or more vertically oriented guide rail lines, a hoisting machine in a first position I, and a first hoisting roping for being moved by the hoisting machine. Accordingly, said installing 100 comprises installing an elevator car, counterweight, one or more vertically oriented guide rail lines, a hoisting machine in a first position I, and a first hoisting roping for being moved by the hoisting machine. Said installing 100 moreover comprises connecting the first hoisting roping to the elevator car and counterweight.

After said installing 100, the method comprises transporting 200 passengers and/or goods with the elevator car vertically in the hoistway while the hoisting machine is in said first position I. After said transporting 200, the method comprises stopping 300 said transporting. After said stopping 300, the method comprises removing 400 said hoisting machine from said first position I and the first roping from the hoistway, said removing 400 comprising disconnecting the first hoisting roping 6 from the elevator car and counterweight. The removing 400 preferably comprises cutting the first roping 6 because in this way the individual ropes of the roping 6 are quick to remove each in more than one part from its position after said disconnecting. The removing 400 preferably comprises also winding the first roping 6, in particular the individual ropes thereof, to one or more rope reels 18. Thus, the first roping 6 is easy and quick to remove from proximity of the hoistway 1.

The method further comprises installing 500 (also referred to as “second” installing) a hoisting machine in a second position II which is higher than the first position I, and a second roping for being moved by the hoisting machine installed in the second position, said installing 500 comprising connecting, after the aforementioned disconnecting the first hoisting roping from the elevator car and counterweight, the second hoisting roping (16 to the elevator car and counterweight. The installing 500 at least partially takes place after said removing 400, namely at least said connecting. However, this is not necessary since if a different hoisting machine 5' is installed to position II than to position I, this installation work can be started at the upper parts of the hoistway 1 already before said removing 400.

After said installing 500, the method comprises transporting 600 passengers and/or goods with the elevator car vertically in the hoistway while the hoisting machine is in said second position II, said transporting 600 comprising moving the elevator car with the hoisting machine and the second hoisting roping.

The steps of said removing 400 performed for the first roping 6 which occur between transportations 200 and 600 particularly facilitate achieving a simple, very swiftly installable, lightweight, and cost effective early usability to serve users with an elevator car moving in lower parts of an elevator hoistway very early after starting of construction work of the building. The roping and other structures can be kept simple and lightweight, e.g. because the suspension roping is changed between transportations 200 and 600.

Figure 2:
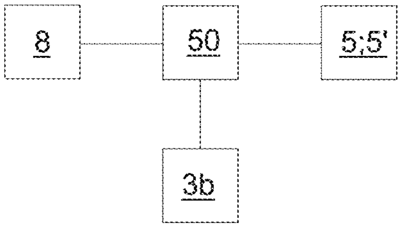
FIG. 2 illustrates preferred connections of the elevator during transporting steps of the method of FIG. 1.

FIG. 2 illustrates preferred connections of the elevator during said transportings 200 and 600. In particular, one or more user interfaces 8 are connected to an elevator control system 50, and elevator control system 50 is connected to the hoisting machine 5;5'. Preferably, said transporting 200 comprises automatically moving the elevator car vertically in the hoistway with the hoisting machine and the first hoisting roping 6 between floors in response to signals received by an elevator control system 50 from one or more user interfaces 8, which are preferably located at one or more floors or inside the elevator car. Said automatically moving is controlled by an elevator control system 50 operating the hoisting machine 5;5'. Correspondingly, preferably, said transporting 600 comprises automatically moving the elevator car vertically in the hoistway 1 with the hoisting machine and the second hoisting roping between floors in response to signals received by an elevator control system 50 from one or more user interfaces 8, which are preferably located at one or more floors or inside the elevator car. Said automatically moving is controlled by an elevator control system 50 operating the hoisting machine 5;5'. Preferably, moreover each said transporting 200;600 comprises automatically opening and closing door(s) of the elevator, in particular the elevator car door 3*a* and/or landing doors 9 within traveling zone of the elevator car 3. For this purpose the elevator control system 50 is preferably connected to at least one door operator motor 3*b*, which may be for example mounted on the car 3 as it is typical in conventional elevators. Generally, automatic steps of the transporting facilitate use of the elevator as a normal elevator having great degree of automation. This facilitates, safety, convenience, smoothness and efficiency of transportation during construction time. Generally, the control system 50 may comprise one or more controllers responsible for different tasks. For example, the control system 50 may comprise separate controllers for the hoisting machine 5;5' and the door operator motor 3*b*. Each controller can comprise one or more processors, such as microprocessors, for example.

A first embodiment implementing the method described referring to FIGS. 1 and 2 is described referring to FIGS. 3-7. A second embodiment implementing the method described referring to FIGS. 1 and 2 is described referring to FIGS. 8-12.

Figure 3:
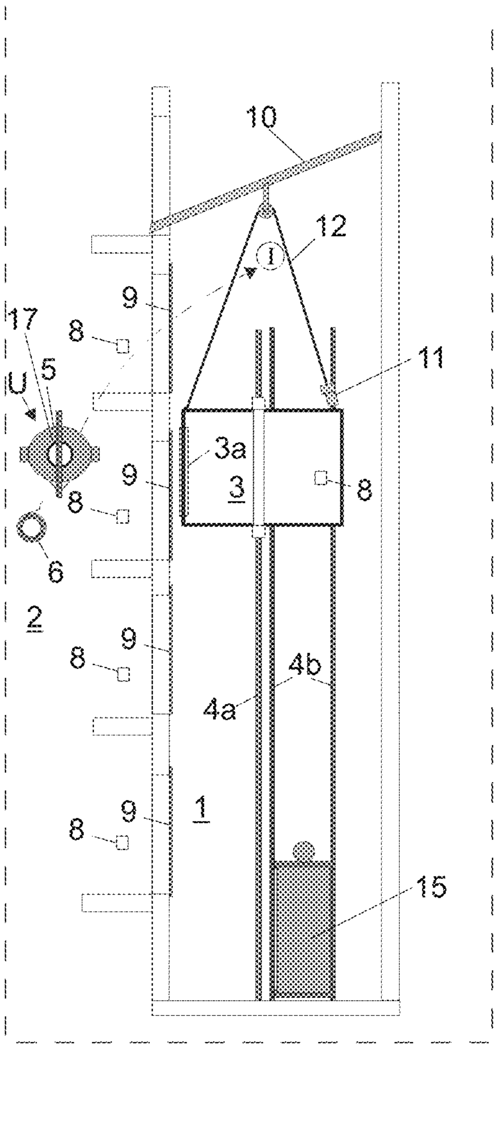
FIG. 3 illustrates a side view of an elevator in an installing phase of a method for constructing an elevator according to an embodiment.

FIG. 3 illustrates a side view of an elevator in the aforementioned phase 100. In this phase 100, elevator components are installed in a hoistway 1, which is still under construction and located inside a building 2 under construction, said components including an elevator car 3, counterweight 15, one or more vertically oriented guide rail lines 4*a*,4*b*, a hoisting machine 5 in a first position I, and a first hoisting 6 roping for being moved by the hoisting machine 5. The installing 100 comprises connecting the first hoisting roping 6 to the elevator car 3 and to the counterweight 15. The result of said installing is visible in FIG. 4. The one or more vertically oriented guide rail lines 4*a*,4*b* preferably comprise two vertically oriented guide rail lines per each of said car 3 and counterweight 15. These guide rail lines 4*a*,4*b* preferably comprise a guide rail line 4*a* of the car 3 on one side of the car 3 (behind the car 3 in FIG. 3), and a guide rail line 4*a* on opposite side of the guide rail 4*a* (in FIG. 3 on the readers side, not showed). The hoisting machine 5 is positioned in said first position Ion the backside of the guide rail line 4*a* of the car 3, i.e. the opposite side than the car 3 (in FIG. 3 behind one of said guide rail lines 4*a*). The guide rail lines 4*a*,4*b* preferably comprise a guide rail line 4*b* of the counterweight 15 on opposite sides of the counterweight 15 (beside the counterweight 15 in FIG. 3).

In the preferred embodiment, said connecting of phase 100 comprises arranging the roping in question 6 to pass around a drive wheel of the hoisting machine 5 in question and suspend the car 3 and counterweight 15 on opposite sides of the drive wheel 17, preferably such that the roping 6 passes on a first side of the drive wheel 17 down to the car 3, around one or more rope wheels thereof and up to a rope terminal device 7, and on a second side of the drive wheel 17 down to the counterweight 15, around one or more rope wheels thereof and up to a rope terminal device 7.

In the preferred embodiment illustrated, said installing 100 a hoisting machine 5 in the first position comprises mounting the hoisting machine 5 on one or more guide rail lines 4*a*,4*b* to be supported vertically by said one or more guide rail lines 4*a*,4*b*. Said mounting may comprise fixing the hoisting machine 5 on an guide rail section forming part of an earlier installed part of a vertically oriented guide rail line 4*a* or prefixing the hoisting machine 5 on an guide rail section to be installed. Accordingly, the hoisting machine 5 may preferably, although not necessarily, be prefixed on a guide rail section so that these can be installed as a unit For this purpose, the method preferably comprises before said installing 100 a phase 90 of providing a hoisting machine unit U as illustrated in FIG. 3, the hoisting machine unit U comprising a hoisting machine 5, and a guide rail section 4*a'*, on which guide rail section 4*a'* the hoisting machine 5 is fixed. This providing 90 then preferably comprises bringing a hoisting machine unit U as mentioned into the hoistway 1 before said installing 100. Then, in said installing 100, the hoisting machine unit U is positioned such that the guide rail section 4*a'* of the hoisting machine unit U is on top and aligned with an earlier installed part of a vertically oriented guide rail line 4*a*. Said prefixing makes the method efficient and accurate, but even though it is preferable to prefix the hoisting machine 5 on a guide rail section, this is not necessary, since the hoisting machine 5 can alternatively be mounted conventionally on an guide rail section forming part of an earlier installed part of a vertically oriented guide rail line 4*a* as above mentioned.

In the preferred embodiment, the installing 100 comprises mounting a first support structure 10 in the hoistway 1 and suspending the elevator car 3 movably with an auxiliary hoisting arrangement 11,12 from the first support structure 10.

In the preferred embodiment, the installing 100 comprises after installing one or more guide rail lines 4*a*, hoisting the elevator car 1 with said auxiliary hoisting arrangement 11,12 along, and guided by, one or more guide rail lines 4*a* into proximity of said first position I, and thereafter performing installing work of said hoisting machine 5 and/or said first roping 6. Preferably, the counterweight 15 is positioned at a lower end of the hoistway 1 while the performing installing work of said hoisting machine 5 and/or said first roping 6. Thus, the relative position of the car 3 and counterweight 15 is easily adjustable correctly at opposite ends of their movement zones, and such that the roping 6 is simply connectable to the car 3 and counterweight 15.

The method preferably comprises installing landing doors 9 before said transporting 200. Therefore, the aforementioned elevator components preferably include landing doors 9 and/or their structures (e.g. sills, frames horizontal guide rails when the landing doors are sliding doors).

The installing 100 preferably comprises using the roof top of the elevator car 3 as an installation platform for installing other elevator components (i.e. components other than said car 3) into the hoistway 1. Said other components preferably include the aforementioned hoisting machine 5 and/or the first roping 6, possibly landing doors 9 and/or their structures (e.g. sills, frames horizontal guide rails when the landing doors are sliding doors). Said using the roof top of the elevator car 3 as an installation platform comprises performing installation work by a person working on the roof top of the elevator car 3. Preferably, the method comprises at a suitable moment after said installing 100 displacing the auxiliary hoisting arrangement 11,12, and suspending a working platform 13 with said auxiliary hoisting arrangement 11,12 from a second support structure 14, which is higher than said first support structure 10.

Figure 4:
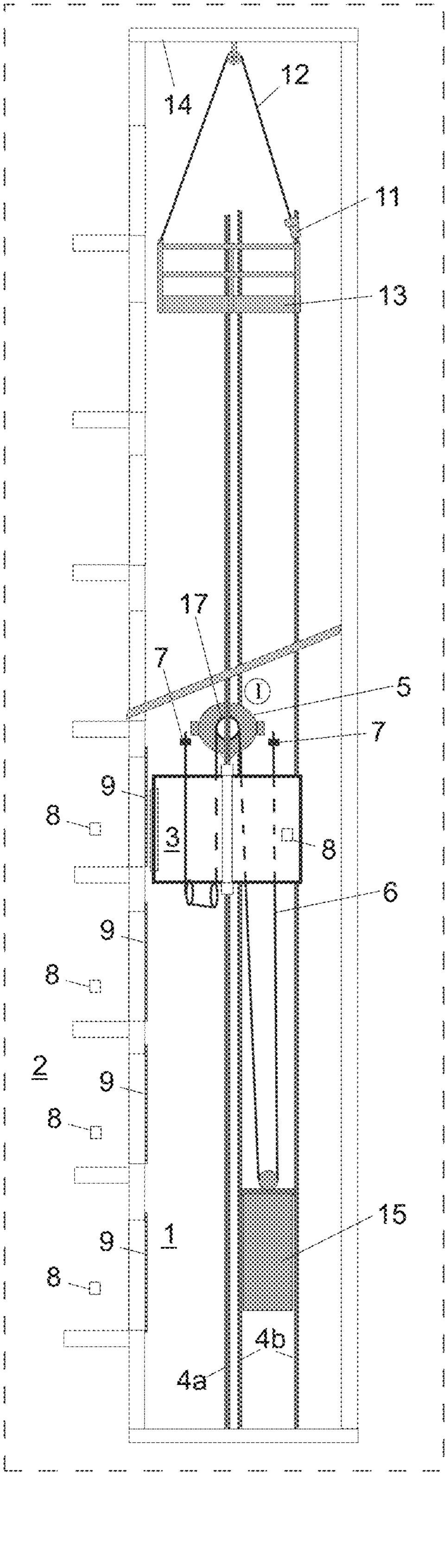
FIG. 4 illustrates a side view of an elevator in a transporting phase of a method for constructing an elevator according to an embodiment.

FIG. 4 illustrates a side view of an elevator in the aforementioned transporting phase 200, which is performed after said installing 100. In this transporting phase 200, passengers and/or goods are transported with the elevator car 3 vertically in the hoistway while the hoisting machine 5 is in said first position I, preferably as described referring to FIG. 2.

The method preferably comprises during said transporting 200 one or more of:

- installing guide rail sections on top of said one or more guide rail lines 4*a*,4*b* in portion of the hoistway 1 which is higher than said hoisting machine 5;
- installing landing doors 9 higher than said hoisting machine 5, in particular between floors and the hoistway 1, which floors are higher than said hoisting machine 5;
- constructing new floors into the building higher than said hoisting machine 5.

Thus, during said transporting 200, construction and/or installing work can be performed above the level of said first position I, at the same time as the car 3 operates serving needs below the level of said first position I.

Said installing guide rail sections on top of said one or more guide rail lines 4*a*,4*b* in portion of the hoistway 1 which is higher than said hoisting machine 5 and/or said installing landing doors between floors and the hoistway, which floors are higher than said hoisting machine 5 comprises moving a working platform 13 in a portion of the hoistway 1 which is higher than said hoisting machine 5, and in particular performing installation work by a person working on the working platform 13. Additionally or alternatively, an installation robot can perform installation work working on the working platform 13. The working platform 13 is preferably as described referring to FIGS. 13-18. Accordingly, the working platform 13 used in said installing is preferably a guide rail installation apparatus 13 as described anywhere in this application. In this case, the method for constructing an elevator preferably comprises providing a guide rail installation arrangement A as described anywhere in this application, and illustrated referring to FIGS. 13-18. Likewise, in this case, the method for constructing an elevator preferably comprises method for installing a guide rail as described referring to FIGS. 13-18.

However, although this is preferable, the working platform 13 need not necessarily be as described referring to FIGS. 13-18, since it can alternatively be different, such as of any known kind.

After said transporting 200, in particular after a period thereof, stopping 300 said transporting 200 is performed. This preferably comprises stopping the aforementioned automatically moving of the elevator car 3.

Figure 5:
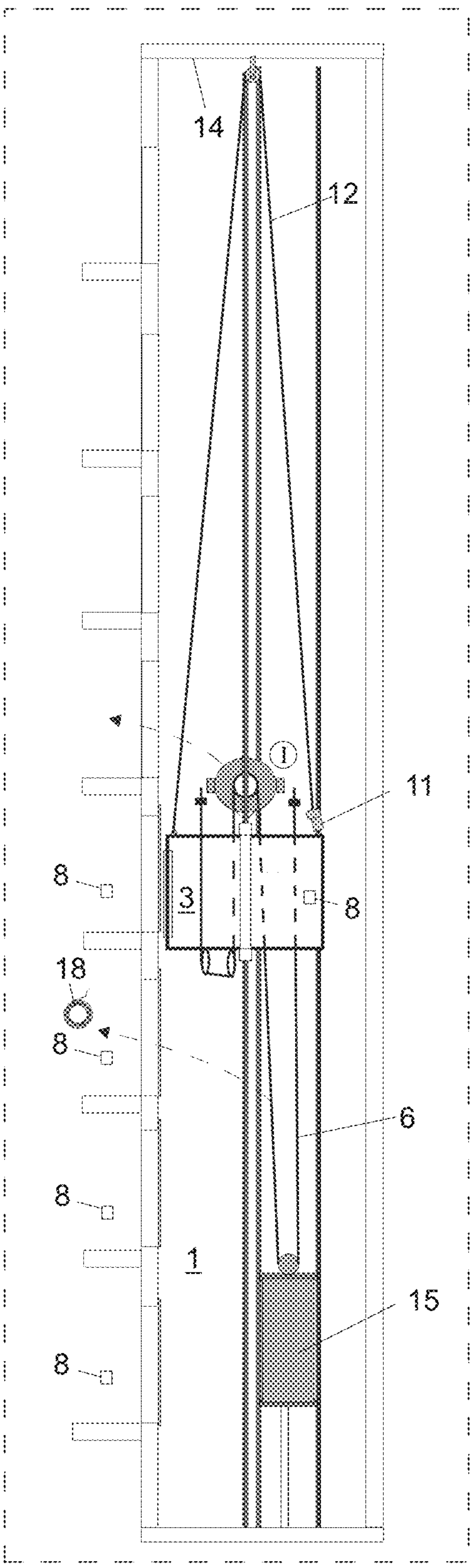
FIGS. 5 and 6 illustrates a side view of an elevator in an installing phase of a method for constructing an elevator according to an embodiment.

After said stopping 300, the method comprises removing 400 said hoisting machine 5 from said first position I and the first roping 6 from the hoistway 1, said removing 400 comprising disconnecting the first hoisting roping 6 from the elevator car 1 and counterweight 15. FIG. 5 illustrates a side view of an elevator when the aforementioned removing 400 is performed. For facilitating said removing 400, the method comprises suspending the car 3 with the aforementioned auxiliary hoisting arrangement 11,12.

Figure 6:
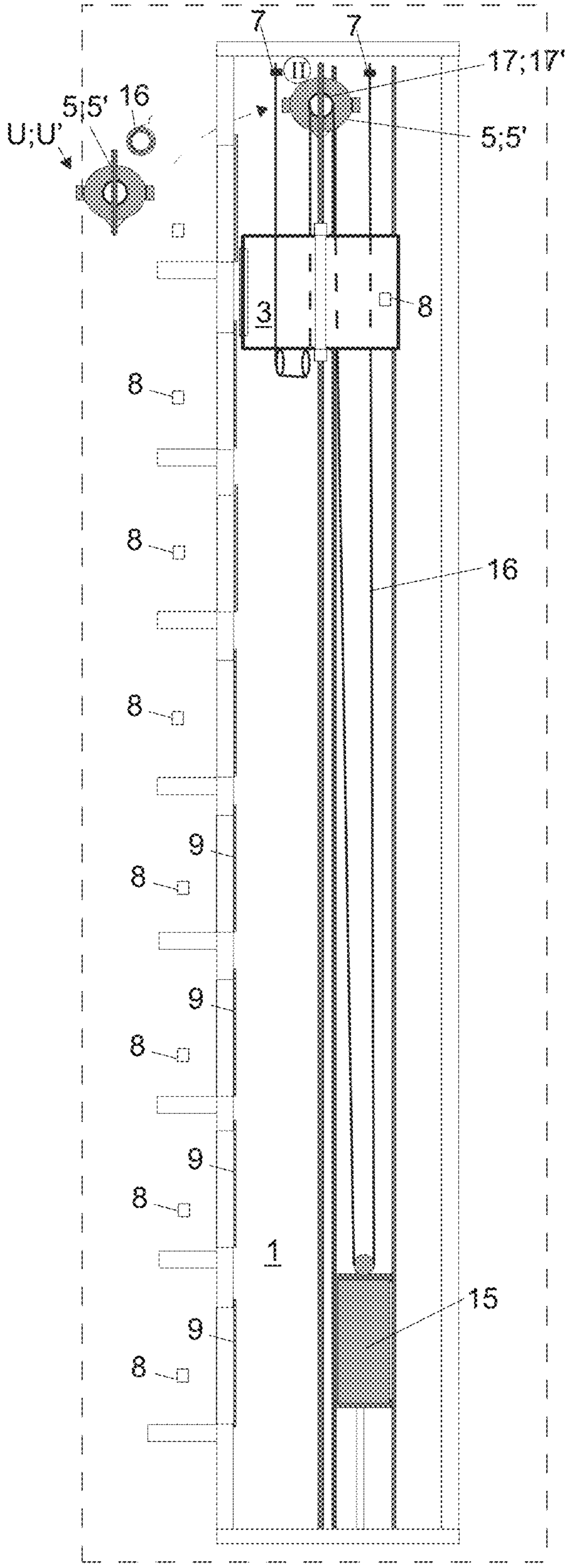

The method further comprises installing 500 a hoisting machine 5;5' in a second position II which is higher than the first position I, and a second roping 16 for being moved by the hoisting machine 5;5' as illustrated in FIG. 6. Said installing 500 comprises, after the aforementioned disconnecting the first hoisting roping 6 from the elevator car 1 and counterweight 15, connecting the second hoisting roping 16 to the elevator car 1 and counterweight 15. The connecting is performed after said disconnecting since in this way the second roping replaces the first roping 6 as a suspension means of the car 3. Preferably, this is implemented such that after said removing 400, the method comprises hoisting the elevator car 1 with the auxiliary hoisting arrangement 11,12 along, and guided by, one or more guide rail lines 4*a* into proximity of said second position I, and thereafter performing installing work of said hoisting machine 5;5' in said second position II and/or said second roping 16. Preferably, the counterweight 15 is positioned at a lower end of the hoistway 1 while the performing installing work of said hoisting machine 5;5' in said second position II and/or said first roping 16. Thus, the relative position of the car 3 and counterweight 15 is easily adjustable correctly at opposite ends of their movement zones, and such that the roping 16 is simply connectable to the car 3 and counterweight 15.

In the preferred embodiment, said connecting of phase 500 comprises arranging the second roping 16 to pass around a drive wheel 17;17' of the hoisting machine 5;5' and suspend the car 3 and counterweight 15 on opposite sides of the drive wheel 17;17', preferably such that the second roping 16 passes on a first side of the drive wheel 17;17' down to the car 3, around one or more rope wheels thereof and up to a rope terminal device 7, and on a second side of the drive wheel 17;17' down to the counterweight 15, around one or more rope wheels thereof and up to a rope terminal device 7.

The hoisting machine that is installed in said second position II in said installing 500 may be said same hoisting machine 5 earlier installed in and removed from said first position I in said installing 100. In this case, the hoisting machine 5 can be hoisted on top of the car roof to the proximity of the second position II. Alternatively, the hoisting machine 5 installed in the first position I is a first hoisting machine, and the hoisting machine 5' installed in the second position II is a second hoisting machine. Then, the installation work of the hoisting machine 5' can start already before the removing 400, which makes the remaining steps of the method swift and downtime can be minimized.

Figure 7:
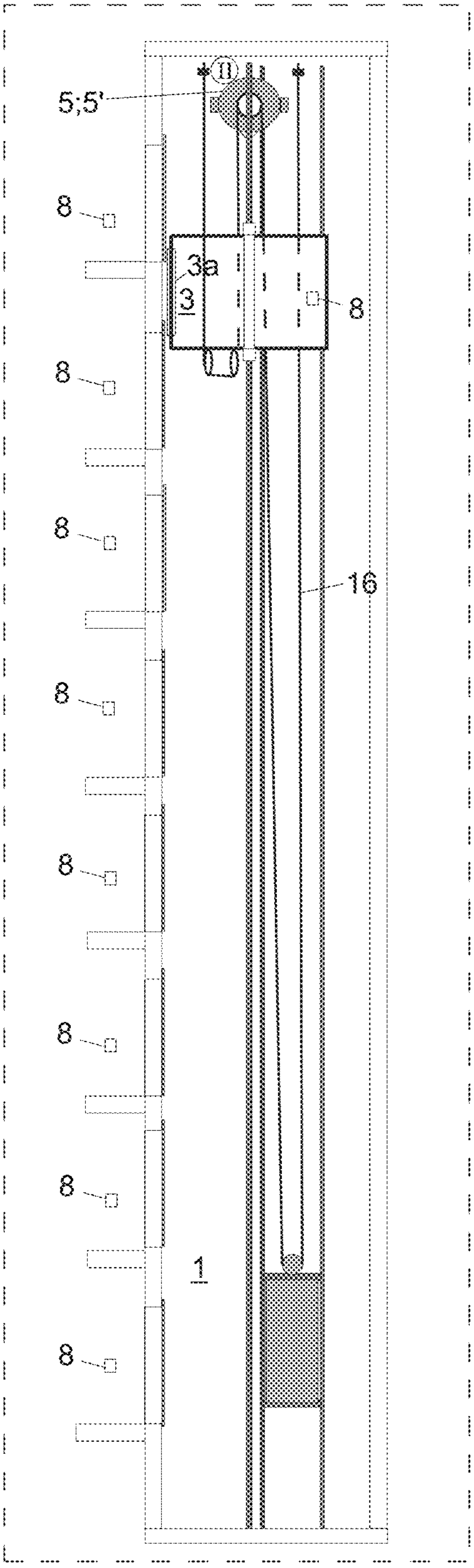
FIG. 7 illustrates a side view of an elevator in a transporting phase of a method for constructing an elevator according to an embodiment.
Figure 8:
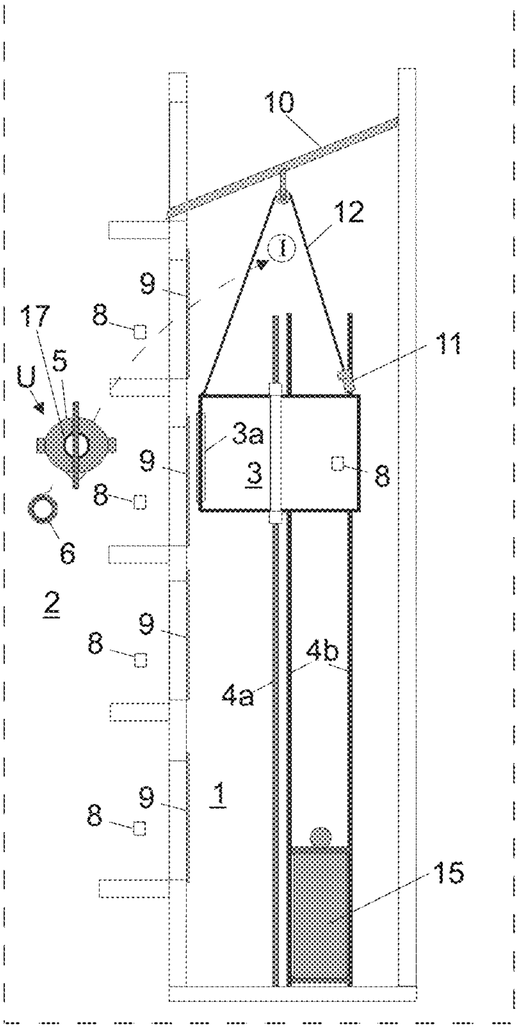
FIG. 8 illustrates a side view of an elevator in an installing phase of a method for constructing an elevator according to an embodiment.

After said installing 500, the method comprises transporting 600 passengers and/or goods with the elevator car 3 vertically in the hoistway 1 while the hoisting machine 5;5' is in said second position II, said transporting 600 comprising moving the elevator car 3 with the hoisting machine 5;5' and the second hoisting roping 16. Said transporting 600 is illustrated in FIG. 7. In this transporting phase 600, passengers and/or goods are transported with the elevator car 3 vertically in the hoistway while the hoisting machine 5;5' is in said second position II, preferably as described referring to FIG. 2.

After said installing 500, the hoisting machine 5;5' installed in said second position II and said second roping 16 are left permanently at their places to form part of the final elevator.

In the preferred embodiment, in the method said first roping 6 is used in transporting passengers and/or goods with an elevator car only while the hoisting machine 5 is in said first position I. Correspondingly, said second roping 16 is used in transporting passengers and/or goods with an elevator car only while the hoisting machine 5:5' is in said second position II. This use of each roping in only one hoisting machine position makes the roping 6;16 and other structures simple and lightweight. The method is quick to take into use and yet a jumping ability is achieved. Use of each roping 6;16 in only one hoisting machine position I;II is reflected by features of the preferred embodiment of the method, in particular in that said installing the first hoisting roping 6 comprises fixing the ends of the first roping to terminal devices 7, in particular such that neither of the opposite ends of individual ropes of the first hoisting roping 6 continues to a rope supply storage such as a rope reel. Thus, no excessive amount of rope need to be provided or stored for later feeding into the system, which might complicate structures and/or the method itself.

A second embodiment implementing the method described referring to FIGS. 1 and 2 is described referring to FIGS. 8-12. The method is similar as described earlier referring to FIGS. 3-7 otherwise but in this embodiment, the comprises during said transporting 200 constructing a machine room 19 above the hoistway 1, and in said installing 500 the second position II is inside the machine room 19, and the second roping is installed to pass through the floor of the machine room 19. Moreover, instead of hoisting the hoisting machine 5;5' on top of the car roof to the proximity of the second position II, the hoisting machine 5;5' may be brought by other means to the machine room 19, such as by some other construction site elevator or a crane or an auxiliary hoisting arrangement. One or more guide rail lines 4*a*,4*b* can be arranged to continue through the floor of the machine room, which guide rail lines are the same by which the hoisting machine 5 was supported vertically in said first position I. It is preferable that the hoisting machine 5;5' is mounted in the machine room 19 to be supported vertically by one or more of the guide rail lines 4*a*,4*b*. Thus, the layout and hoisting machine design need not change and adjusted in the final stages of the method. However, this is not necessary since the hoisting machine 5;5' can be mounted to take support from the floor of the machine room 19, for example.

Generally preferably, each said first and second roping 6,16 comprises plurality of ropes. Generally preferably, all the ropes of said first roping 6 are installed to pass along the same route, and correspondingly all the ropes of said roping 16 are installed to pass along the same route.

Generally preferably, in the moving of each said transporting 200,600 the elevator car 3 is moved along and guided by one or more guide rail lines 4*a*.

Generally, the layout could also be different from what is shown in Figures.

As mentioned after said installing 500, the hoisting machine 5;5' installed in said second position II and said second roping 16 are preferably left permanently at their places to form part of the final elevator. However, it is not necessary, since it is alternatively possible to continue the method with a further jump, including a further stopping, removing, installing and transporting correspondingly as aforementioned steps 200-600 the installation position being a third position higher than said second position and the roping to be installed being a third roping. In this case, the second position II would not be in a machine room.

Generally, although the successive order presented in FIG. 1 is advantageous, it is to be noted that it may be possible to perform some of the steps concurrently. For instance, one or more parts of said installing 500 may be performed during the earlier phases of the method, e.g. during said transporting 200. For example, in the embodiment where the hoisting machine 5' to be installed in second position II is not the same one use in position I, installation thereof need not necessarily wait until the end of said removing 400.

Generally, the method for constructing an elevator can comprise also additional steps not showed. Although, the method has been described advantageously containing a first and second roping, and first and second position respectively, the method could be continued e.g. with further jumps.

FIGS. 13-18 illustrate a guide rail installation apparatus 13 according to an embodiment for being vertically moved guided by a vertical (i.e. vertically oriented) guide rail line 4*a* and to be used in installing one or more additional guide rail sections 4*a"* on top of said guide rail line 4*a* to extend vertical height thereof, the guide rail installation apparatus 13 comprising a frame 20 and a guide arrangement 40 mounted on the frame 20. The guide arrangement 40 comprises a first guide 21 for engaging a vertical guide rail line 4*a* for taking lateral support (i.e. in horizontal direction) from said guide rail line 4*a*; a second guide 22 for engaging a vertical guide rail line 4*a* for taking lateral support from said guide rail line 4*a*; wherein the second guide 22 is above the first guide 21 at a vertical distance thereof. The guide arrangement 40 further comprises a guide channel structure 24 above said second guide 22 for laterally (i.e. in horizontal direction) supporting and guiding a guide rail section 4*a"* to be installed in vertically oriented position towards the upper end face f2 of the guide rail line 4*a* engaged by said second guide 22. This facilitates that the guide rail installation apparatus 13 can be parked in a stable manner and the guide rail section 4" guided in a controlled manner to its intended place on top of said guide rail line 4*a*.

In the preferred embodiment of Figures, said first guide 21 particularly comprises a first guide opening 210 for receiving a guide flange F of said guide rail line 4*a*; and said second guide 21 comprises a second guide opening 22*o* for receiving a guide flange F of said guide rail line 4*a*; and said guide channel structure 24 comprises a third guide opening 24*o* for receiving a guide flange F of said guide rail section 4*a"* to be installed; wherein the vertical projections of said first, second and third guide opening 21*o*,22*o* and 24*o* overlap.

In the preferred embodiment of Figures, each said first, second and third guide opening 21*o*,22*o* and 24*o* is bordered on three lateral sides by a guide part 21*a*-21*c*;22*a*-22*c*;24*a*-24*c*, in particular by a guide face of a guide part 21*a*-21*c*; 22*a*-22*c*;24*a*-24*c*.

In the preferred embodiment illustrated in Figures, the guide arrangement 40 further comprises a third guide 23 for engaging a vertical guide rail line 4*a* for taking lateral support from said guide rail line 4*a*, which third guide 23 is above the second guide 22 at a vertical distance thereof, and the vertically elongated guide opening 24*o* of elongated guide channel structure 24 extends between the second guide 22 and the third guide 23. This facilitates guidance of the guide rail section 4" to be guided by the guide channel structure 24. Hereby, the guide channel structure can receive the guide rail section 4" already prepositioned whereby the guide rail moves into its guidance gently and smoothly. Hereby, also the longitudinal channel structure can be protected from impacts, excessive loads and/or excessive cranking by the guide rail section 4" being passed to its guidance. The lower two guides 21,22 can maintain the guide rail installation apparatus 13 stable even though the third guide 23 is higher than the upper end of the guide rail line 4*a*.

In the preferred embodiment illustrated in Figures, said third guide 23 comprises a fourth guide opening 23*o* for receiving a guide flange F of the guide rail section 4*a"* to be installed and/or said guide rail line 4*a*, wherein the vertical projections of said first, second, third and fourth guide opening 21*o*,22*o*, 23*o* and 24*o* overlap. Said fourth guide opening 23*o* is bordered on three lateral sides by a guide part 23*a*-23*c*, in particular by a guide face of a guide part 23*a*-23*c*. Said third guide 23 is preferably unrotatable relative to the frame 20, whereby when the frame is stationary, the guide 23 can guide the guide rail to be installed accurately to a the desired direction without unnecessary twist.

In the preferred embodiment illustrated in Figures, said first, second and third guide 21,22,24 is a roller guide. This is advantageous, however not necessary since any one or all of them could be sliding guides. Accordingly, the aforementioned guide parts 21*a*-21*c*, 22*a*-22*c*, 24*a*-24*c* of the first, second and third guide can comprise guide parts which are rollers and/or guide parts which are slide members.

In the preferred embodiment illustrated in Figures, the guide rail installation apparatus 13 comprises a working platform floor 27 on top of which a person can stand and/or a safety railing 28 bordering a working space on top of said working platform floor 27.

In the preferred embodiment illustrated In Figures, only one guide arrangement 40 is visible. However, the guide rail installation apparatus 13 preferably comprises a second corresponding guide arrangement 40 and a corresponding guide rail line on the opposite side of the guide rail installation apparatus 13 so that the guide rail installation apparatus 13 is between two guide rail lines. This is however not necessary, since only one guide arrangement 40 provides support facilitating installation of guide rail section on the guide rail line that the guide arrangement 40 engages.

FIGS. 14-18 illustrated preferred details of a guide rail installation arrangement A according to an embodiment comprising a guide rail line 4*a*, a guide rail installation apparatus 13 as described above, and a guide rail section 4*a"* to be installed on top of said guide rail line 4*a*. Said guide rail installation apparatus 13 is mounted on said guide rail line 4*a* such that the first guide 21 engages said vertical guide rail line 4*a* taking lateral support from said guide rail line 4*a* on a first vertical height and said second guide 22 engages said vertical guide rail line 4*a* taking lateral support from said guide rail line 4*a* on a second, higher than said first, vertical height, the upper end face f2 of the guide rail line 4*a* being higher than said second guide 22; and said guide rail section 4*a"* to be installed on top of said guide rail line 4*a* is positioned vertically oriented and laterally supported by the vertically elongated guide channel structure 24, the lower end face f1 thereof being at a distance from the upper end face f2 of the guide rail line 4*a*; the guide rail section 4*a"* being thereby arranged to be lowerable towards the upper end face f2 of the guide rail line 4*a* in vertically oriented position laterally guided by the guide channel structure 24.

Figure 9:
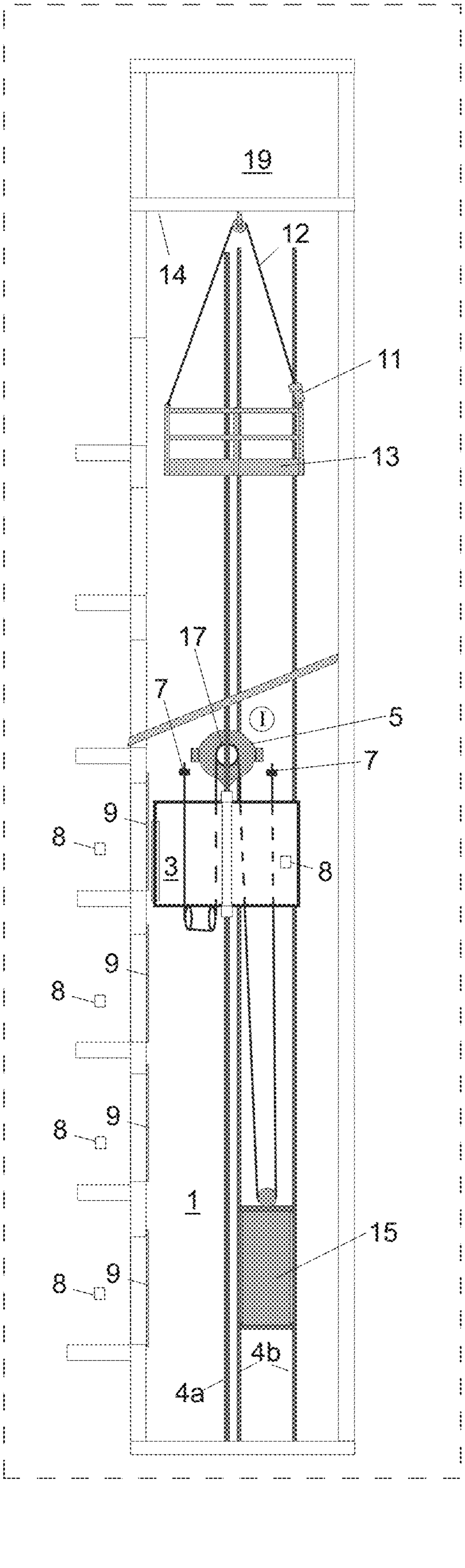
FIG. 9 illustrates a side view of an elevator in a transporting phase of a method for constructing an elevator according to an embodiment.
Figure 10:
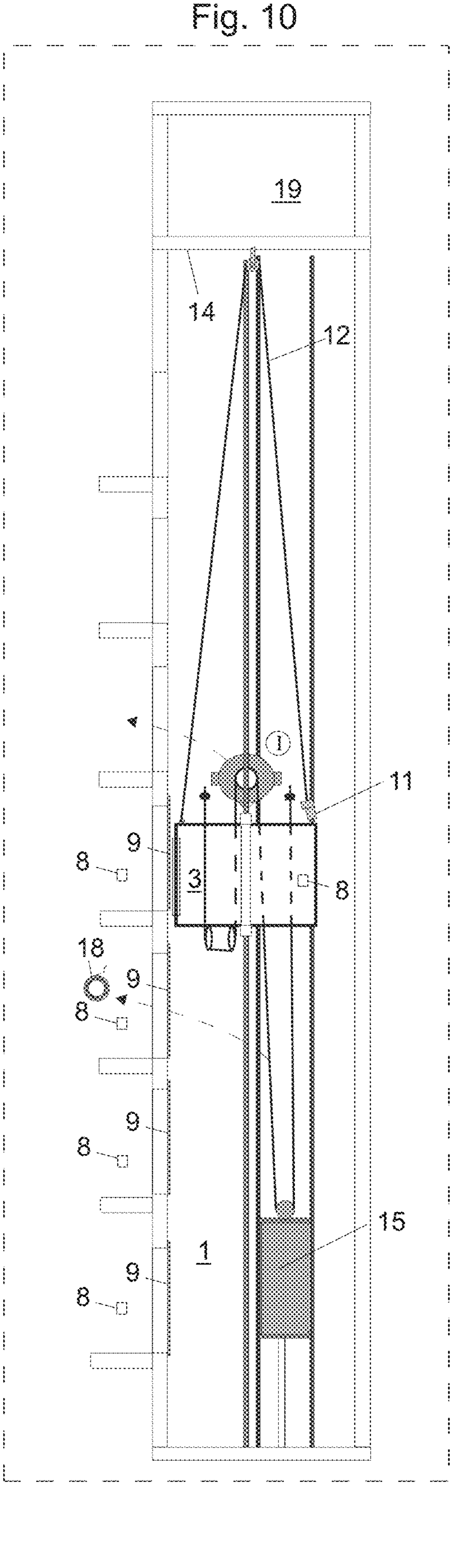
FIGS. 10 and 11 illustrates a side view of an elevator in an installing phase of a method for constructing an elevator according to an embodiment.
Figure 11:
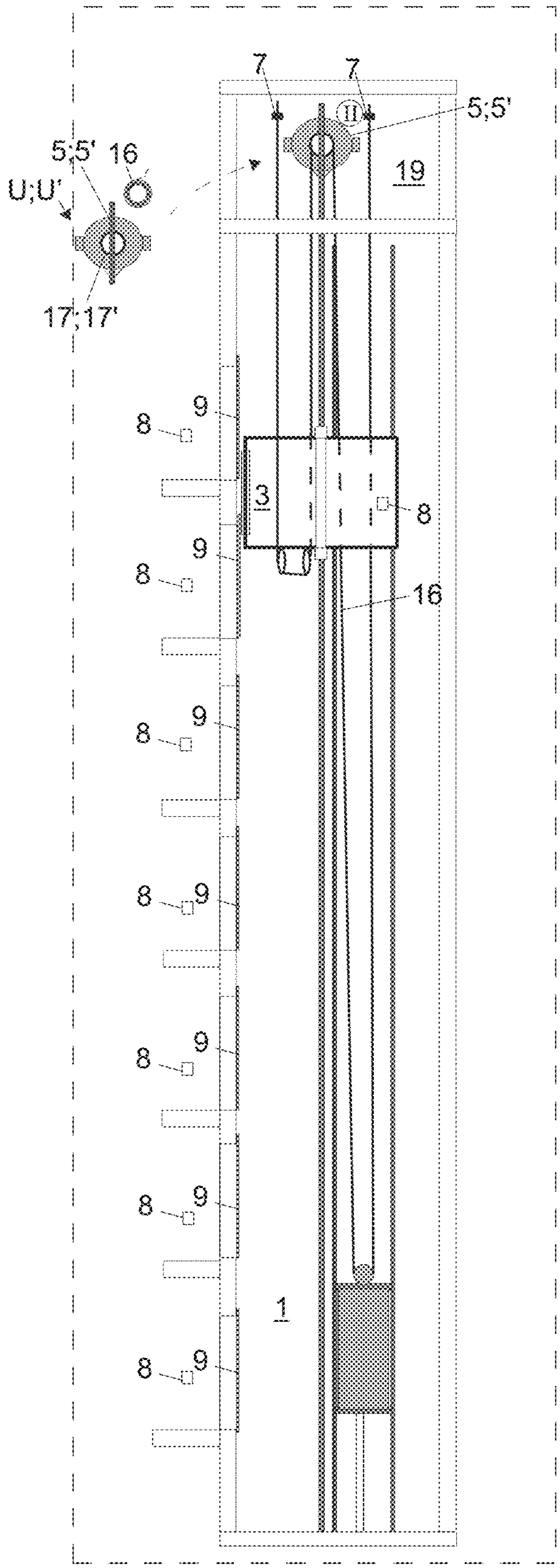
Figure 12:
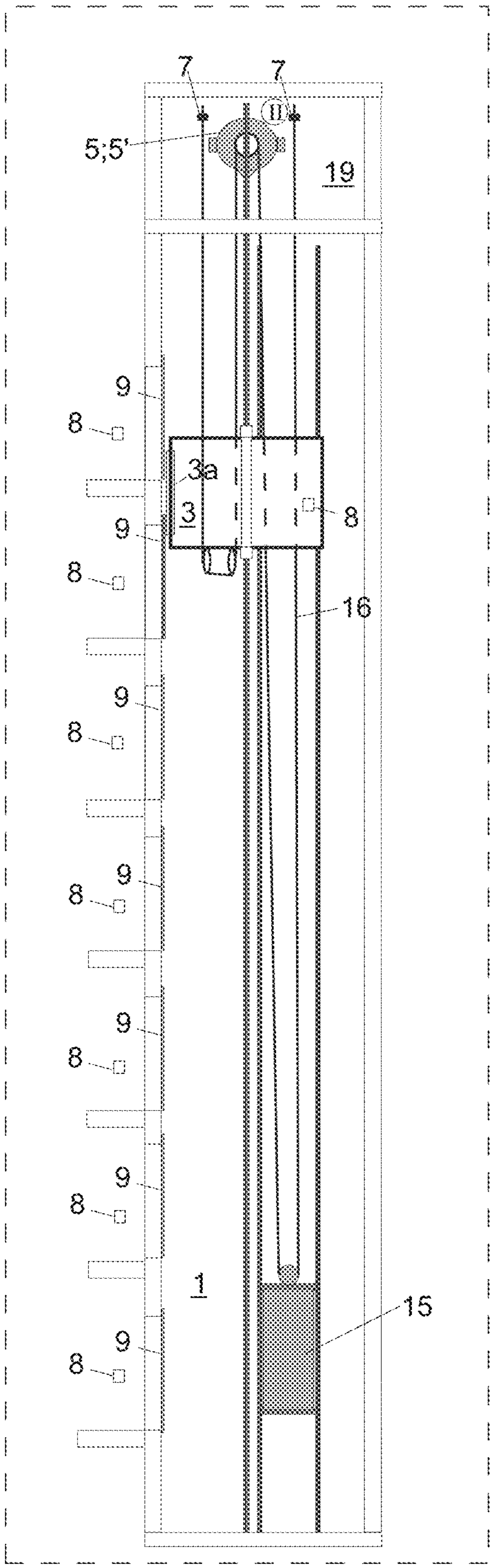
FIG. 12 illustrates a side view of an elevator in a transporting phase of a method for constructing an elevator according to an embodiment.
Figure 13:
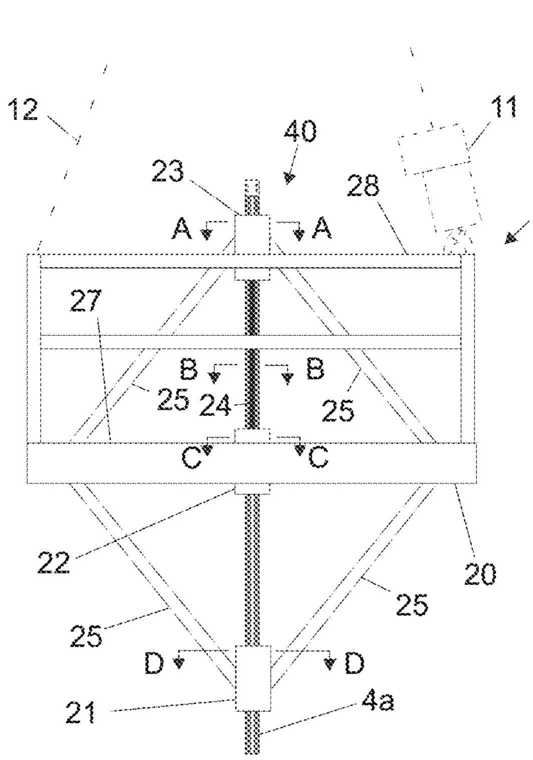
FIG. 13 illustrates a side view of an embodiment of a working platform according to an embodiment.
Figure 14:
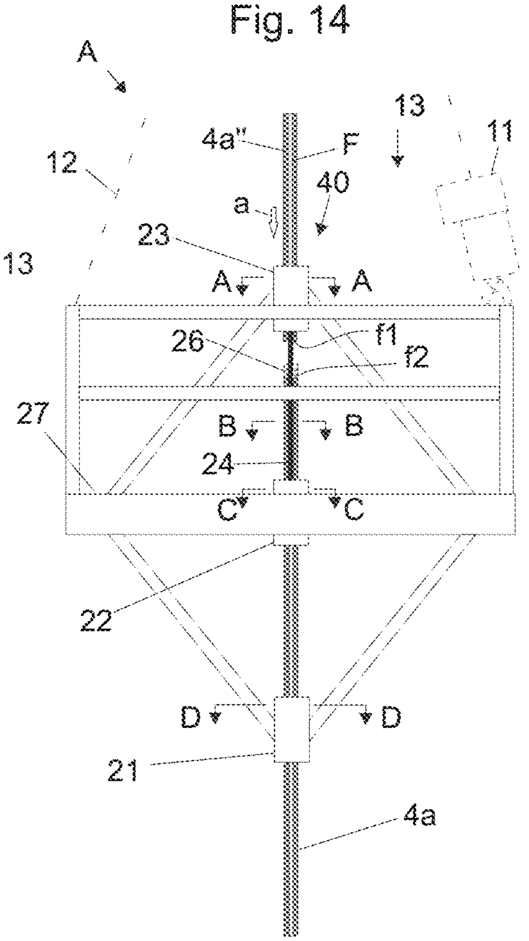
FIG. 14 illustrates the working platform of FIG. 13 during installation of a guide rail section.
Figure 15:
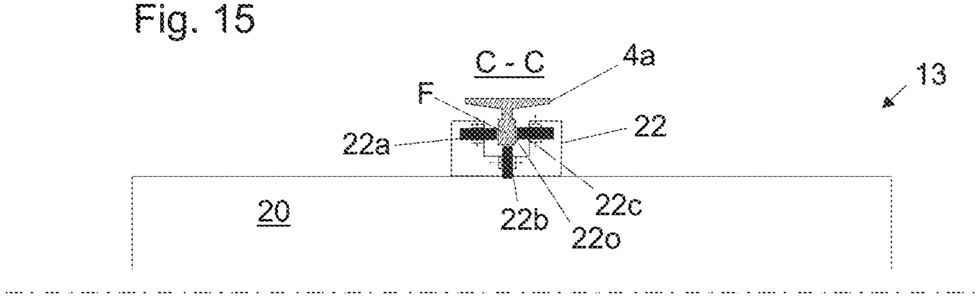
FIG. 15 illustrates cross section C-C of FIGS. 13 and 14.
Figure 16:
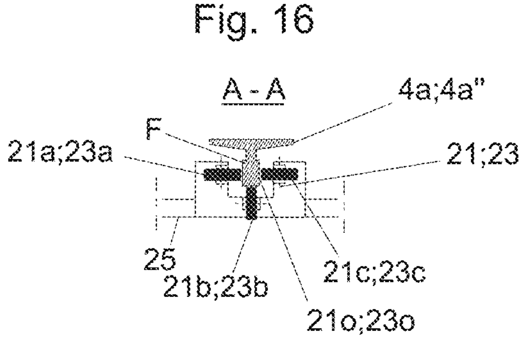
FIG. 16 illustrates cross section A-A of FIGS. 13 and 14.
Figure 17:
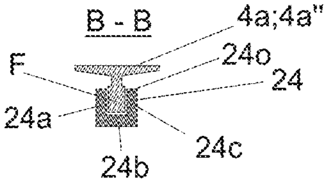
FIG. 17 illustrates cross section B-B of FIGS. 13 and 14.
Figure 18:
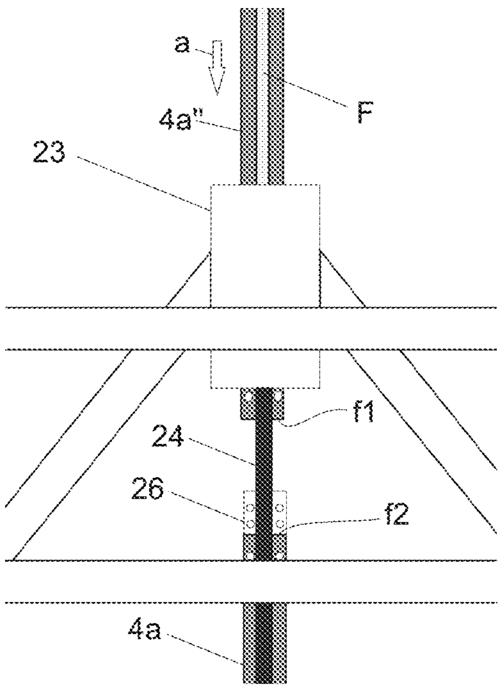
FIG. 18 illustrates an enlarged partial view of FIG. 14.

The guide rail installation apparatus 13 is preferably vertically movable by an auxiliary hoisting arrangement 11,12, as illustrated in the embodiment of FIGS. 13-14 by broken lines, for example. Thus, its position can be changed as desired. Accordingly, the guide rail installation arrangement A preferably comprises an auxiliary hoisting arrangement 11,12 for hoisting the guide rail installation apparatus 13. Preferably, said auxiliary hoisting arrangement 11,12 is arranged to suspend the guide rail installation apparatus 13 while it stays mounted on said guide rail line 4*a*, as above mentioned. In the preferred embodiment, said auxiliary hoisting arrangement 11,12 comprises a hoist and a flexible tension member, such as a chain, rope or cable. The guide rail installation apparatus 13 is preferably suspended by the hoisting arrangement 11,12, in particular via said flexible tension member, from a support structure 14;19 (as shown in FIGS. 4 and 9; not showed in FIGS. 13-18) which is higher than said guide rail installation apparatus 13. Accordingly, the guide rail installation apparatus 13 can be vertically supported by a structure separate from the guide rail line 4*a*. However, this solution is not necessary since other kind of auxiliary hoisting arrangement could be used. For example, alternatively the guide rail installation apparatus 13 could be provided with a means for climbing along the guide rail line 4*a*.

The guide rail section 4*a"* to be installed can be vertically supported in said position by any means, such as manually by a fitter or by an auxiliary hoist for example. Correspondingly, it is lowerable manually or by the auxiliary hoist.

A guide flange F of the lower end of said guide rail section 4*a"* to be installed extends into a third guide opening 24*o* of the vertically elongated guide channel structure 24 for being lowered therein towards the upper end face f2 of the guide rail line 4*a*. A guide flange F of the upper end of said guide rail line 4*a* extends into the third guide opening 24*o* of the vertically elongated guide channel structure 24. It is more specifically provided that the upper portions of the guide faces bordering the third guide opening 24*o* on three lateral sides support laterally a guide flange F of the lower end of said guide rail section 4*a"* to be installed and the lower portions of the guide faces bordering the third guide opening 24*o* on three lateral sides are supported laterally against a guide flange F of the upper end of said guide rail line 4*a*.

Figure 19:
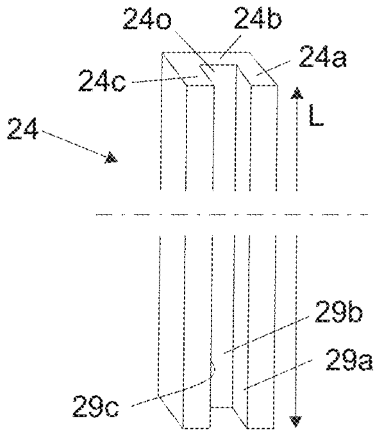
FIG. 19 illustrates preferred details of a guide channel structure of FIGS. 13 and 14.

FIG. 19 illustrates further preferred details of said third guide 23. In the preferred embodiment of FIG. 19, the third guide opening 24*o* is at least 50 cm long in vertical direction. The length has been illustrated by reference L in FIG. 19. The third guide opening 24*o* is elongated in vertical direction and U-shaped in cross-section. The third guide opening 24*o* is bordered on three lateral sides by a guide part 24*o*, in particular a guide face of a guide part 24*a*-24*c*. Said third guide 23 is a sliding guide for engaging with a sliding contact the guide rail section to be installed, in particular a flange F thereof, such that the guide rail section to be installed, in particular the flange F thereof, can be slid against and in contact with the guide faces of the third guide 23. Each guide part 24*a*-24*c* being at least 50 cm long in vertical direction. The guide faces bordering the third guide opening 24*o* on three lateral sides are at least 50 cm long in vertical direction. Thus, a long guide face is provided against and in contact with the guide rail section to be installed can slide laterally supported.

In a method according to an embodiment for installing a guide rail the method comprises providing a guide rail line 4*a*. The guide rail line 4*a* is laterally immovable, e.g. mounted laterally immovably into a hoistway. The guide rail line 4*a* can comprise one or more guide rail sections. In the latter case, the guide rail sections have preferably been piled on top of each other. The method comprises providing a guide rail installation apparatus 13 as defined anywhere above referring to FIGS. 13-19. The method comprises providing a guide rail section 4*a*" to be installed on top of said guide rail line 4*a*.

The method comprises mounting said guide rail installation apparatus 13 on said guide rail line 4*a* such that the first guide 21 engages said vertical guide rail line 4*a* taking lateral support from said guide rail line 4*a* on a first vertical height (i.e. a first level) and said second guide 22 engages said vertical guide rail line 4*a* taking lateral support from said guide rail line 4*a* on a second vertical height (i.e. a second level), which is higher than said first vertical height, the upper end face f2 of the guide rail line 4*a* being higher than said second guide 22. This phase is illustrated in FIG. 13. The method moreover comprises positioning said guide rail section 4*a*" to be vertically oriented and laterally supported by the vertically elongated guide channel structure 24, the lower end face f1 thereof being at a distance from the upper end face f2 of the guide rail line 4*a*; the guide rail section 4*a*" being thereby arranged to be lowerable towards the upper end face f2 of the guide rail line 4*a* in vertically oriented position laterally guided by the guide channel structure 24. This phase is illustrated in FIG. 14. After said positioning, the method comprises lowering the guide rail section to be installed 4*a*" towards the upper end face f2 of the guide rail line 4*a* in vertically oriented position laterally guided by the guide channel structure 24. In said lowering, the guide rail section to be installed 4*a*" moves downwards, as illustrated by arrow a in FIG. 14.

Preferably, in said positioning, a guide rail installation arrangement A is formed, which is as defined anywhere above.

Said positioning comprises moving a guide flange F of the lower end of said guide rail section 4*a*" to extend into a guide opening 24*o* of the vertically elongated guide channel structure 24.

In said lowering a guide flange F of the lower end of said guide rail section 4*a*" moves within a guide opening 24*o* of the vertically elongated guide channel structure 24 towards the upper end face f2 of the guide rail line 4*a*.

In the preferred embodiment, said positioning comprises moving a guide flange F) of the lower end of said guide rail section 4*a*") to extend into a guide opening 23*o*) of the third guide 23), after which said moving a guide flange F) of the lower end of said guide rail section 4*a*" to extend into a guide opening 24*o* of the vertically elongated guide channel structure 24 is performed such that the guide opening 23*o* of the third guide 23 guides movement of said guide rail section 4*a*". In FIG. 14, the guide rail section 4*a*" is showed in a position where the guide flange F of the lower end of said guide rail section 4*a*" extends into a guide opening 23*o* of the third guide 23, and via it into the guide opening 24*o* of the vertically elongated guide channel structure 24.

Said lowering the guide rail section 4*a*" towards the upper end face f2 of the guide rail line 4*a* in vertically oriented position laterally guided by the guide channel structure 24 comprises lowering the guide rail section 4*a*" such that the lower end face f1 thereof moves into contact with the upper end face f2 of the guide rail line 4*a*. In said lowering the lower end moves to be beside a fixing plate 26 earlier fixed to the upper end of the guide rail line 4*a* and protruding above the upper end face f2 of the guide rail line 4*a*.

After said lowering the guide rail section 4*a*" the guide rail section 4*a*" is fixed to the guide rail line 4*a* in particular with said fixing plate 26. This is preferably performed by bolt connection, such as bolts extending through holes of the fixing plate 26 and holes of the guide rail section to be installed 4*a*". In said connection, the bolts are arranged to tighten the fixing plate 26 and the guide rail section 4*a*" together against each other. For this purpose, a nut is screwed on each end of a bolt.

Generally, the arrangement A, the guide rail installation apparatus 13 and the method for installing a guide rail can be utilized in context of any guide rail installation independent on what kind of elevator is being constructed as well as independent on whether the project concerns a jump lift or a conventional lift not utilizing jump lift solutions.

It is to be understood that the above description and the accompanying Figures are only intended to teach the best way known to the inventors to make and use the invention(s). It will be apparent to a person skilled in the art that the inventive concept(s) can be implemented in various ways. The above-described embodiments of the invention(s) may thus be modified or varied, without departing from the invention(s), as appreciated by those skilled in the art in light of the above teachings. It is therefore to be understood that the invention(s) and their embodiments are not limited to the examples described above but may vary within the scope of the claims.

The invention claimed is:

1. A method comprising:

installing elevator components in a hoistway, the installing comprising installing
- a vertically oriented guide rail line,
- an elevator car mounted on a first side of the guide rail line,
- a counterweight,
- a hoisting machine directly mounted on and detachably fixed to a second side of the guide rail lines above the elevator car independent of landing doors of the hoistway in a first position, the second side of the guide rail line opposite to the first side, and
- a first hoisting roping for being moved by the hoisting machine, the installing further comprising connecting the first hoisting roping to the elevator car and the counterweight; and thereafter first transporting passengers and/or goods with the elevator car vertically in the hoistway while the hoisting machine is in the first position; and thereafter stopping the first transporting; and thereafter removing the hoisting machine from the first position and the first hoisting roping from the hoistway, the removing comprising disconnecting the first hoisting roping from the elevator car and the counterweight;

installing the hoisting machine directly mounted on and detachably fixed to the guide rail lines above the elevator car independent of landing doors of the hoistway in a second position which is higher than the first position, and a second hoisting roping for being moved by the hoisting machine, the installing comprising after the aforementioned disconnecting the first hoisting roping from the elevator car and the counterweight, connecting the second hoisting roping to the elevator car and the counterweight; and thereafter second transporting passengers and/or goods with the elevator car vertically in the hoistway while the hoisting machine is in the second position, the second transporting comprising moving the elevator car with the hoisting machine and the second hoisting roping.

2. A method according to claim 1, wherein the first transporting comprises automatically moving the elevator car vertically in the hoistway with the hoisting machine installed in the first position and the first hoisting roping between floors of the hoistway in response to signals received by an elevator control system from one or more user interfaces, the one or more user interfaces being located at at least one of the floors or inside the elevator car.

3. A method according to claim 1, wherein the second transporting comprises automatically moving the elevator car vertically in the hoistway with the hoisting machine installed in the second position and the second hoisting roping between floors of the hoistway in response to signals received by an elevator control system from one or more user interfaces, the one or more user interfaces being located at at least one of the floors or inside the elevator car.

4. A method according to claim 1, wherein the removing the hoisting machine from the first position comprises moving the first hoisting roping out from the hoistway before the second transporting.

5. A method according to claim 1, wherein the removing comprises cutting the first hoisting roping and/or winding it to one or more rope reels.

6. A method according to claim 1, wherein the installing the first hoisting roping comprises fixing ends of the first hoisting roping to terminal devices such that neither of the opposite ends of individual ropes of the first hoisting roping continues to a rope supply storage.

7. A method according to claim 1, wherein the installing the hoisting machine in the first position comprises mounting the hoisting machine on the vertically oriented guide rail lines to be supported vertically by the vertically oriented guide rail lines, and/or wherein the installing the hoisting machine in a second position comprises mounting the hoisting machine on the vertically oriented guide rail lines to be supported vertically by the vertically oriented guide rail lines.

8. A method according to claim 1, wherein the installing elevator components in the hoistway comprises mounting a first support structure in the hoistway and suspending the elevator car movably with an auxiliary hoisting arrangement from the first support structure.

9. A method according to claim 8, wherein the auxiliary hoisting arrangement is mounted on another guide rail line different from the guide rail line holding the elevator car.

10. A method according to claim 1, wherein the installing elevator components in the hoistway comprises, after installing the guide rail lines, hoisting the elevator car with an auxiliary hoisting arrangement along and guided by the guide rail lines into proximity of the first position, and thereafter performing installing work of the hoisting machine and/or the first hoisting roping.

11. A method according to claim 1, wherein the method comprises during the first transporting one or more of:
- installing guide rail sections on top of the vertically oriented guide rail lines in a portion of the hoistway which is higher than the hoisting machine;
- installing landing doors higher than the hoisting machine, in particular between floors and the hoistway, which floors are higher than the hoisting machine;
- constructing new floors from the hoistway higher than the hoisting machine.

12. A method according to claim 11, wherein the installing guide rail sections on top of the vertically oriented guide rail lines in the portion of the hoistway which is higher than the hoisting machine and/or the installing landing doors between floors and the hoistway, which floors are higher than the hoisting machine comprises moving a working platform in the portion of the hoistway which is higher than the hoisting machine, and in particular performing installation work by a person working on the working platform.

13. A method according to claim 1, wherein the hoisting machine installed in the first position is a first hoisting machine, and the hoisting machine installed in the second position is a second hoisting machine, or wherein the hoisting machine that is installed in the second position in the installing is a same hoisting machine installed in the first position in the installing elevator components in a hoistway.

14. A method according to claim 1, wherein each of the connectings comprise arranging the roping in question to pass around a drive wheel of the hoisting machine in question and suspend the car and counterweight on opposite sides of the drive wheel, such that the roping in question passes on a first side of the drive wheel down to the car, around one or more rope wheels thereof and up to a rope terminal device, and on a second side of the drive wheel down to the counterweight, around one or more rope wheels thereof and up to a rope terminal device.

15. A method according to claim 1, wherein the installing the hoisting machine in a second position comprises mounting the hoisting machine inside a machine room located above the hoistway.

16. A method according to claim 1, wherein the method comprises before the installing elevator components in the hoistway, a phase of providing a hoisting machine unit, the hoisting machine unit comprising the hoisting machine, and a guide rail section, on which guide rail section the hoisting machine is fixed, and in the installing elevator components in the hoistway, the hoisting machine unit is moved and positioned such that the guide rail section of the hoisting machine unit is on top and aligned with earlier installed part of the vertically oriented guide rail line.

* * * * *